United States Patent
Kellner et al.

(10) Patent No.: US 11,993,176 B2
(45) Date of Patent: May 28, 2024

(54) BATTERY HOUSING FOR BATTERY MODULE OF A TRACTION BATTERY OF A MOTOR VEHICLE

(71) Applicant: Dr. Ing. h.c. F. Porsche Aktiengesellschaft, Stuttgart (DE)

(72) Inventors: Philipp Kellner, Rennigen (DE); Christopher Volkmer, Niefern-Öschelbronn (DE); Sascha Mostofi, Zeltingen (DE); Immanuel Vogel, Kornwestheim (DE); Dieter Schiebel, Korntal-Münchingen (DE); Thomas Neuhauser, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 60 days.

(21) Appl. No.: 17/381,523

(22) Filed: Jul. 21, 2021

(65) Prior Publication Data
US 2022/0024349 A1  Jan. 27, 2022

(30) Foreign Application Priority Data
Jul. 22, 2020 (DE) .................... 10 2020 119 285.1

(51) Int. Cl.
*B60L 58/26* (2019.01)
*B60L 50/64* (2019.01)

(52) U.S. Cl.
CPC .............. *B60L 58/26* (2019.02); *B60L 50/64* (2019.02)

(58) Field of Classification Search
CPC .................................. B60L 58/26; B60L 50/64
See application file for complete search history.

(56) References Cited

U.S. PATENT DOCUMENTS

| 10,741,893 B2 | 8/2020 | Kellner et al. |
| 10,784,544 B2 | 9/2020 | Kellner et al. |

(Continued)

FOREIGN PATENT DOCUMENTS

| CN | 106571501 A | 4/2017 |
| CN | 111435762 A | 7/2020 |

(Continued)

OTHER PUBLICATIONS

Great Britain Combined Search and Examination Report for Application No. GB2110483.1, dated Apr. 5, 2022, 6 pages.

(Continued)

*Primary Examiner* — James A Shriver, II
*Assistant Examiner* — Nicholas R. Kandas
(74) *Attorney, Agent, or Firm* — Buchanan Ingersoll & Rooney PC

(57) ABSTRACT

A battery housing for a battery module of a traction battery of a motor vehicle has (i) a housing for enclosing at least one battery cell of the battery module, (ii) at least one cooling groove which is formed in at least one housing wall of the housing after which is open away from the battery cell and which serves for conducting a cooling fluid, and (iii) a cover which is configured as a planar plate and which is connected to the housing wall and which serves for closing the at least one cooling groove. Owing to the cooling groove formed in the housing wall, the cover can be configured as an inexpensive planar plate, such that cooling of a battery module is made possible with little outlay in terms of production.

22 Claims, 2 Drawing Sheets

(56) References Cited

U.S. PATENT DOCUMENTS

| | | | |
|---|---|---|---|
| 11,437,668 | B2 | 9/2022 | Schmitt et al. |
| 2016/0156080 | A1 | 6/2016 | Enning et al. |
| 2018/0269547 | A1 | 9/2018 | Robert et al. |
| 2020/0028223 | A1* | 1/2020 | Berge .................. B60K 1/04 |
| 2020/0112071 | A1 | 4/2020 | Geskes et al. |
| 2020/0398652 | A1* | 12/2020 | Stephens ............ B62D 25/025 |
| 2022/0021048 | A1* | 1/2022 | Boddakayala |

FOREIGN PATENT DOCUMENTS

| | | |
|---|---|---|
| DE | 102012012663 A1 | 12/2013 |
| DE | 102012217367 A1 | 3/2014 |
| DE | 202018101387 U1 | 4/2018 |
| DE | 102017104710 A1 | 9/2018 |
| DE | 102017128529 A1 | 6/2019 |
| JP | 2020113446 A | 7/2020 |
| JP | 2021064448 A | 4/2021 |
| KR | 20170103238 A | 9/2017 |
| KR | 20200036765 A | 4/2020 |
| WO | 2018104505 A1 | 6/2018 |
| WO | WO2018/104505 A1 * | 6/2018 |

OTHER PUBLICATIONS

Japanese Notice of Reasons for Refusal for Japanese Application No. 2021-114846, dated Aug. 3, 2022, with translation, 7 pages.
English translation of the Office Action (First Office Action) dated Dec. 30, 2023, by the National Intellectual Property Administration, P. R. China in corresponding Chinese Patent Application No. 202110820622.9. (7 pages).

* cited by examiner

BATTERY HOUSING FOR BATTERY MODULE OF A TRACTION BATTERY OF A MOTOR VEHICLE

CROSS-REFERENCE TO RELATED APPLICATION

This application claims priority to German Patent Application No.: 10 2020 119 285.1, filed Jul. 22, 2020, the content of such application being incorporated by reference herein in its entirety.

FIELD OF THE INVENTION

The invention relates to a battery housing, with the aid of which a battery module of a traction battery of a motor vehicle can be housed and temperature-controlled.

BACKGROUND OF THE INVENTION

DE 10 2017 104 710 A1, which is incorporated by reference herein, has disclosed a battery housing for a battery module of a traction battery of a motor vehicle, wherein the battery housing has a depression into which a profiled additional component is inserted in order to form cooling channels between the additional component and a flat base of the depression.

SUMMARY OF THE INVENTION

There is a constant demand to reduce the outlay in terms of production for cooling of a battery module.

Described herein are measures which allow cooling of a battery module with little outlay in terms of production.

One aspect of the invention relates to a battery housing for a battery module of a traction battery of a motor vehicle, having a housing for enclosing at least one battery cell of the battery module, at least one cooling groove which is formed in at least one housing wall of the housing and which is open away from the battery cell and which serves for conducting a cooling fluid, and a cover which is configured as a planar plate and which is connected to the housing wall and which serves for closing the at least one cooling groove.

The housing for the battery module may be based on a rectangular tube into which battery cells can be inserted and which is subsequently closed at the end side. By virtue of the fact that the at least one cooling groove is already formed in the material that forms the housing, a heat conduction resistance between the battery cells and the cooling fluid in the cooling grooves can be kept particularly low. At any rate, a heat conduction resistance between an external cooling plate, which has cooling channels with a cooling fluid caused to flow through, of a cooling system and the material of the housing can be reduced. Instead, the cooling fluid that flows through the cooling groove is in direct contact with the material of the housing. The cooling power can thus be improved.

The at least one cooling groove is in this case formed so as to be outwardly open away from the battery cells or away from an interior space, which is delimited by the housing, for accommodating the battery cells. The cover to be connected to the respective housing wall can thus be easily placed onto the housing wall from the outside and fastened for example by adhesive bonding or friction stir welding. The assembly process is thus kept simple. Additionally, the cover is configured as a planar plate, such that protruding projections, ribs or the like are avoided. The cover can thus be easily generated, from a metal plate or plastics plate present in the form of a semifinished part, exclusively by stamping using a suitable stamping tool. The outlay in terms of production is thus very low. Here, use is made of the awareness that the housing already has a complex structure adapted to the intended use and is possibly subjected to reworking in any case, and the at least one cooling groove can be generated particularly easily and in inexpensive fashion during the reworking, whereas no further working steps are required for the production of the cover. In particular in the case of the housing, on the one hand, and the at least one cover, on the other hand, being produced at distributed locations, it is thus possible to realize cost savings in the production process. Owing to the cooling groove formed in the housing wall, the cover can be configured as an inexpensive planar plate, such that cooling of a battery module is made possible with little outlay in terms of production.

In particular, the cover has an inlet opening, which communicates with the cooling groove and which serves for the feed of the cooling fluid, and/or has an outlet opening, which communicates with the cooling groove and which serves for the discharge of the cooling fluid. The cooling fluid can thus be fed and/or discharged through the cover. The corresponding inlet opening and/or outlet opening can be easily generated concomitantly during the generation of the cover, in particular by stamping, such that the outlay in terms of production is kept low.

Preferably, at an edge of the housing wall, there is formed an inlet opening, which is delimited by the cooling groove and by the cover and which serves for the feed of the cooling fluid, and/or an outlet opening, which is delimited by the cooling groove and by the cover and which serves for the discharge of the cooling fluid. The cooling fluid can thus be fed and/or discharged at the edge of the housing, in particular at an end side or transversely with respect to the longitudinal extent of the housing. In this way, it is easily possible for multiple battery housings of identical design to be connected in series and for the same cooling fluid to be used in structural-space-saving fashion for the temperature control of the battery cells in the different battery housings. The outlet opening of one battery housing may be fluidically connected to an oppositely situated inlet opening of another battery housing by means of a structural-space-saving connecting piece, which is in particular configured merely as a seal.

It is particularly preferable if the housing is configured as an extruded rectangular profile, in particular rectangular tube, wherein the at least one cooling groove is generated by compression forming and/or cutting working. The housing, which can cover the battery cells from four different sides, can thus be produced inexpensively. At those housing walls on which it is intended to generate the at least one cooling groove, it is easily possible for a material thickness to be provided which is greater than that of a housing wall without cooling groove. By means of non-cutting or cutting working of the material of the housing wall provided for this, the at least one cooling groove can be easily formed in after the extrusion process. For example, immediately after the extrusion step and before a cooling step, the housing may still be warm and easily moldable, such that the at least one cooling groove can be easily embossed into the housing wall in non-cutting fashion prior to a solidification of the housing in the cooling step. It is however also possible for the cooling groove to be generated in cutting fashion, for example by milling, only after the solidification of the housing.

In particular, the at least one housing wall is configured for dissipating mechanical loads, wherein a material, which delimits the at least one cooling groove, of the housing wall contributes to the stiffening of the housing wall. The housing wall may be dimensioned so as to dissipate not only the inherent weight and the weight force of the accommodated battery cells but also impact forces that arise for example in the event of an accident ("crash"), in order to protect the battery cells against mechanical damage. In particular, the housing is load-bearing along an extrusion direction, wherein the at least one cooling groove is provided in one or more load paths of the housing. The mechanical behavior of the housing during the dissipation of load can be influenced by means of the configuration of the at least one cooling groove. For example, with the aid of the cooling groove, a predetermined breaking point for a crash event can be provided in order to dissipate impact energy through the absorption of deformation work and in order to protect the battery cells that are accommodated in the housing.

Preferably, the cooling groove has a shape configuration which deviates from a straight profile, wherein, in particular, the cooling groove runs in an angled and/or zigzag-shaped and/or meandering manner. The geometry and/or the course of the cooling groove can in principle be freely selected. In this way, the area of contact of the cooling fluid with the material of the housing that is to be temperature-controlled can be considerably enlarged. The cooling power can thus be increased. Furthermore, the cooling fluid can be discharged at a higher temperature, which makes the passive cooling of the cooling fluid, for example in a front-end radiator of the motor vehicle, easier and more efficient. The efficiency of the cooling can thus be improved.

It is particularly preferable if the cover has a centering opening which can be mounted onto a centering body of the housing wall. The centering opening can for example be mounted or pressed onto the centering body. In this way, the relative position of the cover with respect to the housing wall which has the cooling groove and which is to be covered can be precisely specified, without the need for the cover to have protruding lugs or tabs for this purpose. The centering and the positioning of the cover can thus be achieved without a complex three-dimensional shape configuration of the cover.

In particular, the housing has at least two, preferably at least four, housing walls equipped with at least one cooling groove, preferably with multiple cooling grooves. In contrast to an underbody plate which is provided for the cooling of the battery cells and through which a cooling fluid flows, the housing and the battery cells accommodated therein can be cooled from more than one side. The cooling power and/or the cooling efficiency can thus be improved.

A further aspect relates to a battery module for a traction battery of a motor vehicle, having at least one battery cell and having a battery housing, which may be designed and refined as described above, for enclosing the at least one battery cell, wherein the battery cell lies directly, or exclusively only via a heat-conducting layer, against the housing wall equipped with the at least one cooling groove. A heat transfer resistance between the battery cell to be cooled and the cooling fluid that is separated in media-tight fashion by means of the housing wall can thus be minimized. Owing to the cooling groove formed in the housing wall, the cover can be configured as an inexpensive planar plate, such that cooling of a battery module is made possible with little outlay in terms of production.

Preferably, the only active temperature control of the at least one battery cell is provided exclusively by way of the exchange of heat of the at least one battery cell with the cooling fluid that can be caused to flow in the at least one cooling groove. An additional underbody cooling arrangement can be omitted, and/or replaced by the cooling power of the at least one cooling groove formed in the at least one housing wall. The outlay in terms of construction for the cooling of the battery cells can thus be kept low in an inexpensive manner.

BRIEF DESCRIPTION OF THE DRAWINGS

The invention is explained below by way of example with reference to the appended drawings on the basis of preferred exemplary embodiments, wherein the features presented below may in each case individually or in combination represent an aspect of the invention, in which.

DETAILED DESCRIPTION OF THE INVENTION

Figure 1:
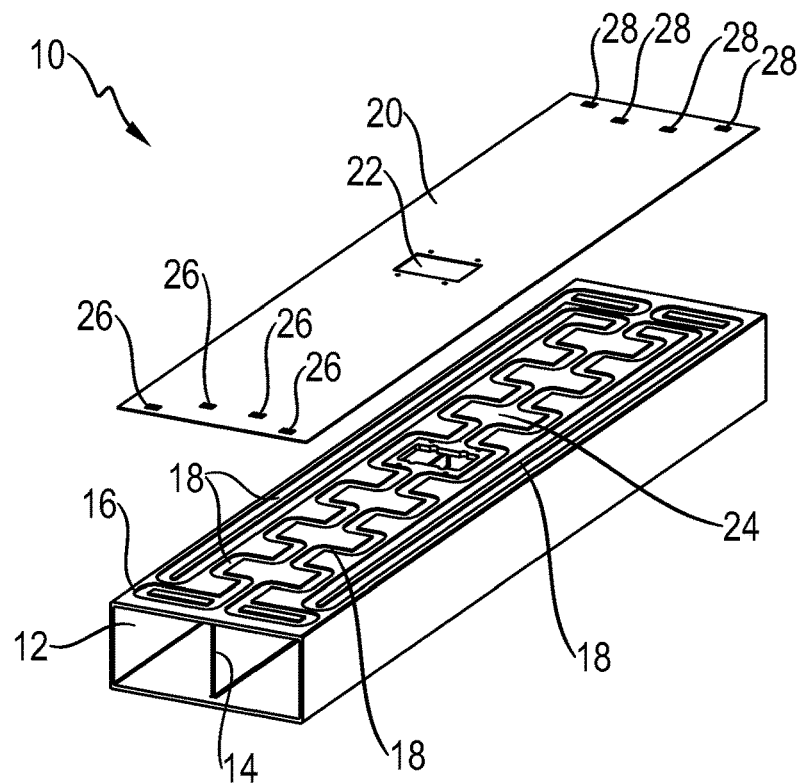
FIG. 1 shows a schematic perspective view of a battery housing prior to the assembly process.
Figure 3:
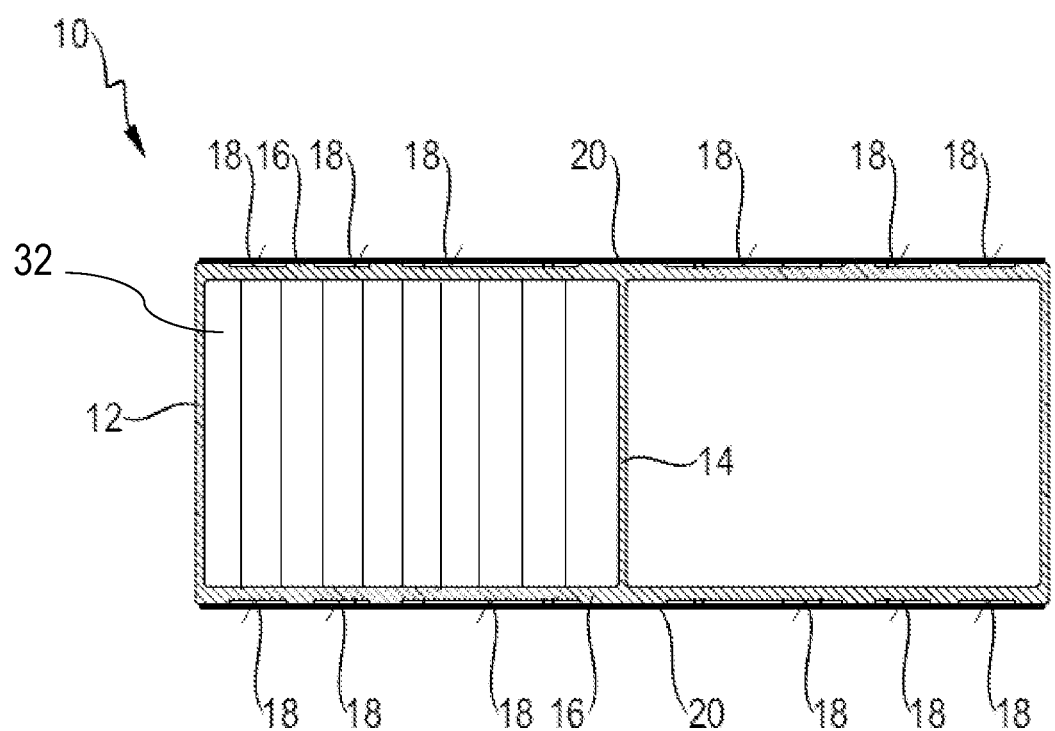
FIG. 3 shows a schematic sectional view of the battery housing from FIG. 2.

The battery housing 10 illustrated in FIG. 1 can be used for accommodating battery cells 32 (shown in FIG. 3) in order to form a battery module for a traction battery for the electric drive of a motor vehicle. The battery housing 10 has an extruded housing 12 which is produced from plastics material and which is configured as a rectangular profile and in which, for example, there is inserted a partition 14, which partition corresponds to the extrusion direction and runs in the longitudinal direction of the housing 12 and serves for dividing the housing 12 into multiple sub-chambers. For example, in an upper housing wall 16 of the housing 12, there are formed multiple cooling grooves 18 which run in particular in meandering form and through which a cooling fluid can flow in order to control the temperature of, in particular in order to cool and/or pre-warm, the housing 12 and the battery cells 32 that are accommodated in the housing 12. By means of a cover 20 which is configured as a planar plate, the cooling grooves 18 can be closed, such that a cooling channel is formed which is delimited by the cooling groove 18 of the housing wall 16 and an underside of the cover 20. In addition or alternatively, at least one cooling groove which is closed by another cover may also be provided in the other walls of the housing 12 in order to correspondingly increase the cooling power for the cooling of the battery cells 32, as illustrated in FIG. 3.

Figure 2:
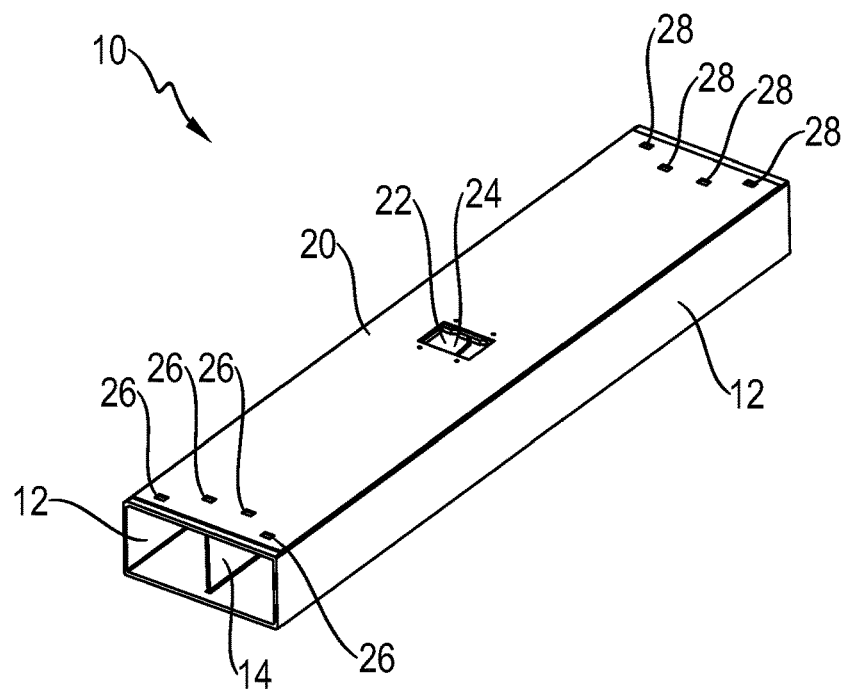
FIG. 2 shows a schematic perspective view of the battery housing from FIG. 1 after the assembly process.

As is illustrated in FIG. 2, the cover 20 may have a centering opening 22 which can be mounted onto a centering body 24 formed in the housing wall 16 in order to specify a defined relative position of the cover 22 with respect to the housing wall 16, without the cover 20 requiring elevations which protrude out of the material plane of the cover 20. In the exemplary embodiment illustrated in FIG. 2, the cover 20 has in each case one inlet opening 26 and one outlet opening 28 for the various cooling channels, via which inlet opening and outlet opening the cooling fluid can enter and exit orthogonally with respect to the extrusion direction of the housing 12. Via the inlet opening 26 and the outlet opening 28, the respective cooling channel can be connected to a cooling circuit which, in particular, has an external heat exchanger, in particular a front-end radiator, which is aircooled by relative wind, of the motor vehicle, in order to preferably passively cool the warmed cooling fluid to a desired operating temperature again.

Figure 4:
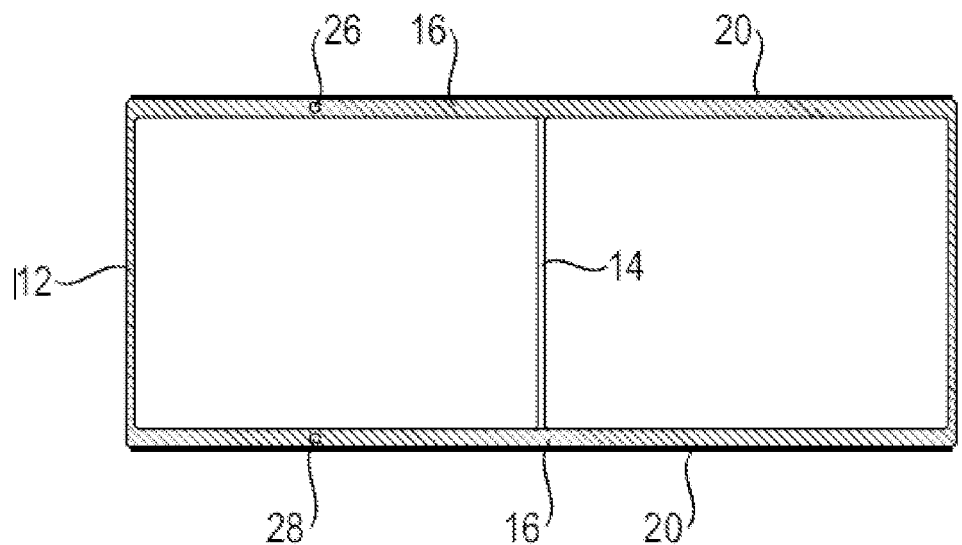
FIG. 4 shows a schematic frontal view of an alternative embodiment of the battery housing from FIG. 2.

As illustrated in FIG. 4, at least one of the inlet openings 26 and/or one of the outlet openings 28 may additionally or alternatively be provided on the end side of the housing 12. For this purpose, the associated cooling groove 18 may be designed to be open to the end side of the housing 12, such that the inlet opening 26 or the outlet opening 28 respectively is formed on the end side of the housing between the cooling groove 18 and the cover 20.

What is claimed:

1. A battery housing for a battery module of a traction battery of a motor vehicle, said battery housing comprising:
    a housing for enclosing at least one battery cell of the battery module, the housing having an extruded rectangular profile including a lower housing wall, an upper housing wall, and two side housing walls;
    at least one cooling groove formed in the upper housing wall, wherein the at least one cooling groove serves for conducting a cooling fluid, and the at least one cooling groove is open in a direction facing away from the battery cell;
    a cover in the form of a planar plate that is connected to the upper housing wall and which serves for closing the at least one cooling groove; and
    at least one housing inlet opening that is fluidly connected to the at least one cooling groove, the at least one housing inlet opening being disposed on an end side of the upper housing wall, and wherein the at least one housing inlet opening is disposed at an elevation below the cover.

2. The battery housing as claimed in claim 1, wherein the cover comprises (i) at least one cover inlet opening that is formed in the cover and communicates with the cooling groove and serves for the feed of the cooling fluid, and/or (ii) an outlet opening that communicates with the cooling groove and serves for the discharge of the cooling fluid.

3. The battery housing as claimed in claim 1, further comprising an outlet opening which serves for the discharge of the cooling fluid and is disposed on a top surface of the upper housing wall, and that is delimited by the cooling groove and by the cover, wherein the at least one housing inlet opening serves for the feed of the cooling fluid.

4. The battery housing as claimed in claim 1, wherein the housing is configured as an extruded rectangular tube, and wherein the at least one cooling groove is formed by compression forming and/or cutting.

5. The battery housing as claimed in claim 1, wherein the upper housing wall is configured for dissipating mechanical loads, wherein a material, which delimits the at least one cooling groove of the upper housing wall, contributes to stiffening of the upper housing wall.

6. The battery housing as claimed in claim 1, wherein the cooling groove has a shape configuration which deviates from a straight profile, and wherein the cooling groove runs in an angled and/or zigzag-shaped and/or meandering manner.

7. A battery housing for a battery module of a traction battery of a motor vehicle, said battery housing comprising:
    a housing for enclosing at least one battery cell of the battery module, the housing having an extruded rectangular profile including a lower housing wall, an upper housing wall, and two side housing walls;
    at least one cooling groove and a centering body formed in the upper housing wall, wherein the at least one cooling groove serves for conducting a cooling fluid, and the at least one cooling groove is open in a direction facing away from the battery cell; and
    a cover in the form of a planar plate that is connected to the upper housing wall and which serves for closing the at least one cooling groove, wherein the cover has a centering opening that is configured to be mounted onto the centering body of the upper housing wall, and wherein the centering opening in the cover and the centering body in the upper housing wall define a relative position of the cover with respect to the upper housing wall, such that the cover does not require elevations which protrude out of a material plane of the cover.

8. The battery housing as claimed in claim 1, wherein the housing has at least two housing walls that are each equipped with at least one cooling groove.

9. A battery module for a traction battery of a motor vehicle, having at least one battery cell and having said battery housing as claimed in claim 1 for enclosing the at least one battery cell, wherein the battery cell lies directly, or exclusively only via a heat-conducting layer, against the upper housing wall equipped with the at least one cooling groove.

10. The battery module as claimed in claim 9, wherein the only active temperature control of the at least one battery cell is provided exclusively by way of the exchange of heat of the at least one battery cell with the cooling fluid that can be caused to flow in the at least one cooling groove.

11. The battery housing as claimed in claim 1, wherein the housing has at least four housing walls each equipped with more than one cooling groove.

12. The battery housing as claimed in claim 3, wherein the cooling fluid enters through the at least one housing inlet opening and exits through the outlet opening orthogonally with respect to an extrusion direction of the housing.

13. The battery housing as claimed in claim 1, further comprising a second cover provided on one of the bottom housing wall or one of the two side housing walls.

14. The battery housing as claimed in claim 1, wherein the housing comprises plastics material and the housing is configured as a rectangular profile with a partition extending in a longitudinal direction of the housing.

15. The battery housing as claimed in claim 14, wherein the partition divides the housing into multiple sub-chambers.

16. The battery housing as claimed in claim 1, wherein the cooling grooves are arranged between the upper housing wall and the cover.

17. The battery housing as claimed in claim 3, wherein the outlet opening is formed at an edge of the upper housing wall between the cooling groove and the cover.

18. The battery housing as claimed in claim 1, wherein the at least one housing inlet opening is disposed on the top surface of the upper housing wall at a location spaced away from an edge of the upper housing wall.

19. The battery housing as claimed in claim 1, wherein the at least one housing inlet opening is disposed on the top surface of the upper housing wall at an end side of the upper housing wall with respect to a longitudinal extent of the housing and away from the edge of the cover.

20. The battery housing as claimed in claim 1, wherein the at least one housing inlet opening is disposed on the top surface of the upper housing wall at an end side of the upper housing wall and wherein the at least one housing inlet opening is oriented transversely with respect to the longitudinal extent of the housing.

21. The battery housing as claimed in claim 1, wherein the cover comprises a plurality of cover inlet openings that communicate with the cooling groove and serves for the feed of the cooling fluid, and wherein a first group of the plurality of cover inlet openings are arranged along a first line parallel to an end side of the cover and transversely with respect to a longitudinal extent of the housing.

22. The battery housing as claimed in claim 21, wherein a second group of the plurality of cover inlet openings are arranged along a second line parallel to the end side of the cover and transversely with respect to the longitudinal extent of the housing, and wherein the first line is closer to the end side of the cover than the second line.

\* \* \* \* \*